United States Patent [19]

Hautmann et al.

[11] E Patent Number: Re. 32,017

[45] Reissued Date of Patent: Nov. 5, 1985

[54] TOILET FLUSH WATER COLORIZER

[75] Inventors: Horst Hautmann, Neuburg; Georg Schimanski, Hagen, both of Fed. Rep. of Germany

[73] Assignee: Globol-Werk GmbH, Neuburg, Fed. Rep. of Germany

[21] Appl. No.: 427,493

[22] Filed: Sep. 29, 1982

Related U.S. Patent Documents

Reissue of:

[64] Patent No.: 4,168,551
Issued: Sep. 25, 1979
Appl. No.: 899,289
Filed: Apr. 24, 1978

[51] Int. Cl.[4] ..... E03D 9/02

[52] U.S. Cl. ..... 4/231; 4/223

[58] Field of Search ..... 4/228, 227, 222, 231, 4/223; 222/434, 438

[56] References Cited

U.S. PATENT DOCUMENTS

| | | | |
|---|---|---|---|
| 1,091,374 | 3/1914 | Miller | 4/228 |
| 1,745,010 | 1/1930 | de Lamprecht | 4/225 |
| 1,880,912 | 10/1932 | Duwelius | 4/231 |
| 2,950,959 | 8/1960 | Relle | 4/222 X |
| 3,423,182 | 1/1961 | Klasky | 4/228 X |
| 3,444,566 | 1/1969 | Spear | 4/228 |
| 3,529,309 | 5/1969 | Leavitt et al. | 4/231 |
| 3,537,112 | 11/1970 | Goodman | 4/231 |
| 3,538,520 | 11/1970 | Leavitt | 4/222 |
| 3,588,926 | 6/1971 | Buck et al. | 4/231 |
| 3,766,576 | 10/1973 | Ancel | 4/231 |
| 3,943,582 | 3/1976 | Daeninckx | 4/227 |
| 4,064,572 | 12/1977 | Wicks et al. | 4/228 |

FOREIGN PATENT DOCUMENTS

| | | | |
|---|---|---|---|
| 127885 | 6/1974 | Denmark . | |
| 49602 | 11/1880 | Fed. Rep. of Germany . | |
| 198003 | 3/1908 | Fed. Rep. of Germany | 4/228 |
| 937640 | 1/1956 | Fed. Rep. of Germany . | |
| 1053424 | 9/1959 | Fed. Rep. of Germany . | |
| 1136673 | 9/1962 | Fed. Rep. of Germany | 4/231 |
| 24318 | 8/1969 | Fed. Rep. of Germany . | |
| 1286972 | 9/1969 | Fed. Rep. of Germany . | |
| 1930773 | 1/1970 | Fed. Rep. of Germany . | |
| 1609225 | 5/1971 | Fed. Rep. of Germany . | |
| 2255161 | 8/1973 | Fed. Rep. of Germany . | |
| 323662 | 7/1975 | Fed. Rep. of Germany . | |
| 2603585 | 8/1977 | Fed. Rep. of Germany | 4/225 |
| 481235 | 11/1916 | France . | |
| 1117332 | 5/1956 | France . | |
| 2244880 | 4/1975 | France . | |
| 937640 | 1/1956 | Netherlands | 4/231 |
| 503167 | 3/1971 | Switzerland | 4/227 |
| 21720 | of 1908 | United Kingdom | 4/228 |
| 379553 | 9/1932 | United Kingdom | 4/228 |
| 1035210 | 7/1966 | United Kingdom . | |
| 1103761 | 2/1968 | United Kingdom . | |

*Primary Examiner*—Henry K. Artis
*Attorney, Agent, or Firm*—Gilbert L. Wells; Heinrich W. Herzfeld

[57] ABSTRACT

[A toilet flush water colorizer comprises a container adapted for receiving therein a flush water-coloring block and having at least one entry opening for admitting flush water thereinto, and outlet means for the discharge of colored flush water from the container, which colorizer further comprises suspending means for suspending the container at the inside of a toilet bowl, a diluting chamber in the interior of the container adapted for collecting drops of color concentrate dripping off a block after each flushing, the outlet means being located in the bottom of the diluting chamber.] *A toilet flush colorizer container is suspendable in a toilet bowl. The upper part of the container admits flush water and, after passing over a colorizer block, colored water collects in a diluting chamber. The colored water is transferred to the toilet bowl by means of a siphon in the bottom of the diluting chamber.*

8 Claims, 7 Drawing Figures

Fig.6
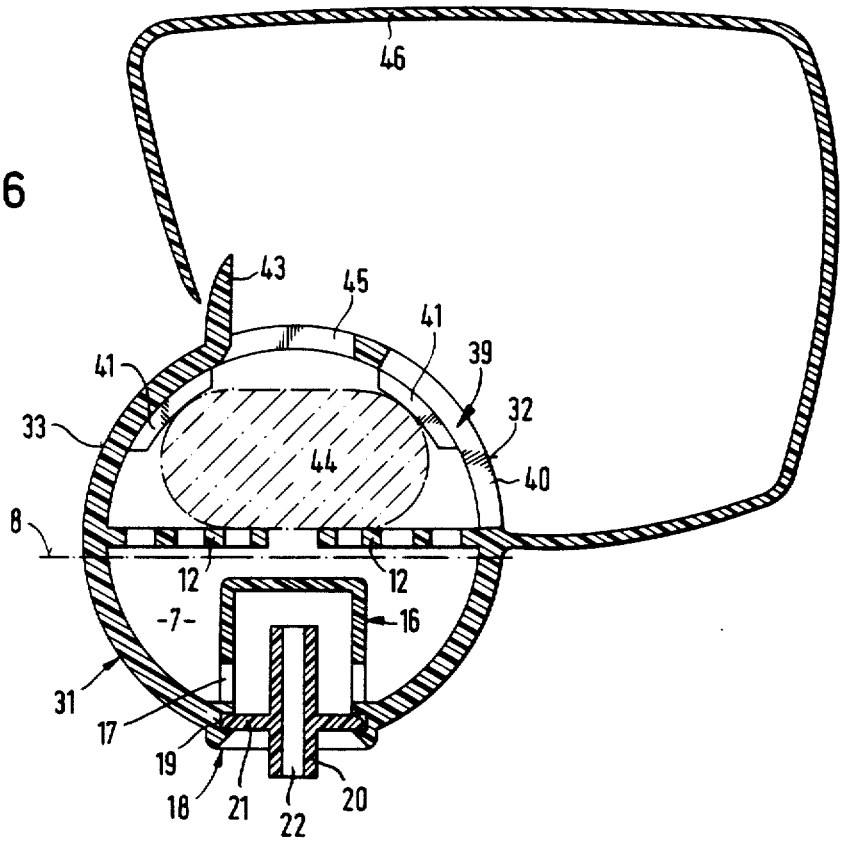
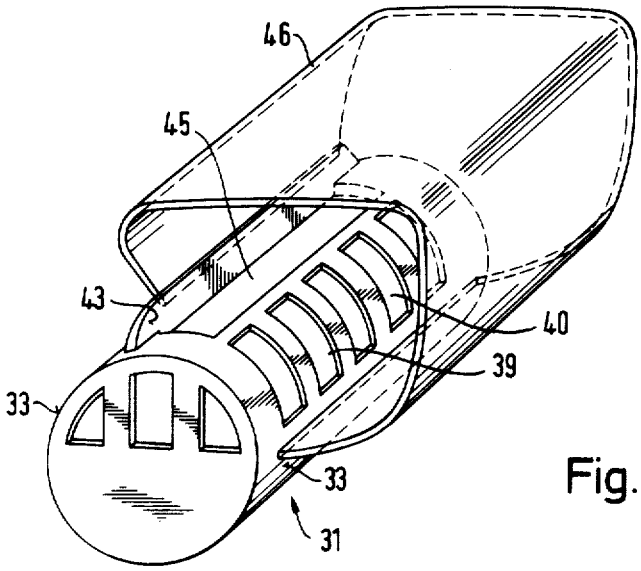
Fig.7

TOILET FLUSH WATER COLORIZER

Matter enclosed in heavy brackets [ ] appears in the original patent but forms no part of this reissue specification; matter printed in italics indicates the additions made by reissue.

BACKGROUND OF THE INVENTION

This invention relates to a toilet flush water colorizer which comprises a container adapted for receiving therein a flush water-coloring block and having at least one entry opening for admitting flush water thereinto, and outlet means for the discharge of colored flush water from the container.

Toilet flush water colorizers of the above-described type are known, for instance, from British Pat. No. 1,057,865 to J. Goddard & Sons Limited, wherein a recipient containing an erodable coloring block, i.e. a block which is slowly dissolved and/or disintegrated from the outside inwardly by the flush water, is placed or hung into the cistern of the flush water of a toilet.

The coloring block contains as primary ingredient a soluble coloring material such as a dyestuff or pigment, a blue coloring of the flush water in the toilet bowl being preferred. Of course, such blocks or sticks are also known to contain disinfectants or deodorants, as well as cleaning agents. When, after actuation of the flushing device of the toilet, repeatedly over a prolonged period of time, e.g. for a month or more, the flush water leaves the cistern uncolored, this will indicate that the coloring block has been consumed, its coloring agent being exhausted. Replacement of the exhausted block by a new one requires that the user can take off the lid of the cistern, put in the new block and then fasten the lid back in place. However, increasingly, such cisterns are being manufactured of thermoplastic resin material and after mounting the discharge valve means therein the lid is fastened on the cistern by means of glueing or thermic welding, thus making replacement impossible.

As the effectiveness of active ingredients, in particular of deodorants, of such blocks which have been discharged from the block into the flush water in a toilet cistern is only very weak and hence unsatisfactory, blocks or sticks containing such ingredients have for some time been suspended in a small slotted container, e.g. a small elongated basket, at the inner sidewall of a toilet bowl, as has been described in French Pat. No. 1,602,063 to Madison Chemical Corporation (see also U.S. patent application Ser. No. 693,488 filed on Dec. 26, 1967 by Seymour Leavitt, in particular FIG. 3).

However, if a toilet bowl cleansing block of this type would contain a coloring agent such as a blue dyestuff, besides the deodorant, disinfectant and cleansing agents now conventionally present therein, in order to color the flush water in the toilet bowl, e.g. a blue color, at each flushing of the toilet, then this would have the drawback, confirmed by the applicant in numerous tests, that after each flushing, when the flow of flush water has subsided, there is still an "after-dripping" of the block, i.e., drops of flush water continue for a prolonged period of time, depending on the erodibility of the block, in fact often for five to ten hours or more, to flow down the sidewall of the toilet bowl. The concentration of colorant in these drops increases with time, thus producing on the sidewall a stripe of color, e.g. of blue, which extends from the block container downwardly causing an unclean, unesthetic aspect of the bowl. This stripe is the more difficult to remove, the longer the "after-dripping" has lasted.

OBJECTS AND SUMMARY OF THE INVENTION

The invention sets out to solve this problem and to provide a toilet flush water colorizer of the initially described type which can be hung in a toilet bowl in a similar manner as described supra in the case of the Leavitt cleansing block, without suffering from the above-described serious drawback of staining the internal sidewall of the toilet bowl by after-dripping of drops of increasing colorant concentration from the block after each flushing.

It is another object of the invention to provide a toilet flush water colorizer of the initially described type from which only diluted colored flush water is discharged.

These objects are attained according to the invention in a toilet flush water colorizer of the initially described type which further comprises suspending means for suspending the container at the inside of a toilet bowl and a diluting chamber in the interior of the container adapted for collecting drops of color concentrate dripping off a block after each flushing, and wherein the outlet means are located in the bottom of the diluting chamber.

In a preferred embodiment of the toilet flush water colorizer according to the invention, the diluting chamber comprises (a) supporting means in the container across the upper end of the diluting chamber therein and adapted for supporting a flush water-coloring block in the container above the diluting chamber, which supporting means have at least one opening for permitting flush water to pass from the upper part of the container into the diluting chamber, and (b) the container has a bottom and side walls, the latter being closed up to the upper end of the diluting chamber, and wherein (c) the outlet means are located in the bottom of the container and are siphoning means adapted for siphoning off flush water from the diluting chamber down to a minimum sump level.

The supporting means can have a plurality of openings which are narrow enough to prevent larger pieces of a colorizing block being eroded by flush water from dropping into the diluting chamber. Moreover, the supporting means can comprise projections from the inner side wall of the container into the interior of the latter. These supporting means can also comprise a grid or perforated plate adapted for supporting a coloring block.

The siphoning means can comprise a suction tube in the lower part of the diluting chamber for suctioning off colored flush water under the hydrostatic pressure thereof which prevails in the diluting chamber.

Preferably, the suction tube is sealingly inserted in the bottom of the diluting chamber and has its upper end curved whereby its upper opening is near the bottom of the diluting chamber.

In a most preferred embodiment, the suction tube is sealingly inserted upright in the bottom of the diluting chamber, having its upper opening near the upper end of the diluting chamber and its lower opening in or underneath the said bottom, and in which embodiment the siphoning means further comprise a cover member mounted on the bottom of the diluting chamber and having a closed upper part inside which the upper end of the said suction tube opens; the cover member further has ports near or at the bottom of the diluting chamber for the passage of colored flush water from the latter chamber into the interior of the cover member and onward into the suction tube.

BRIEF DESCRIPTION OF THE DRAWINGS

Further details of the toilet flush water colorizer according to the invention will be explained in the following description of preferred embodiments of the same illustrated in the accompanying drawings. In the latter

FIG. 6 is a cross-sectional view of another embodiment of the toilet flush water colorizer according to the invention, and FIG. 7 is a perspective view of the embodiment shown in FIG. 6 seen from the front and above, and having the conventional suspending clamp partially broken away.

DETAILED DESCRIPTION OF THE EMBODIMENTS SHOWN IN THE DRAWINGS

Figure 1:
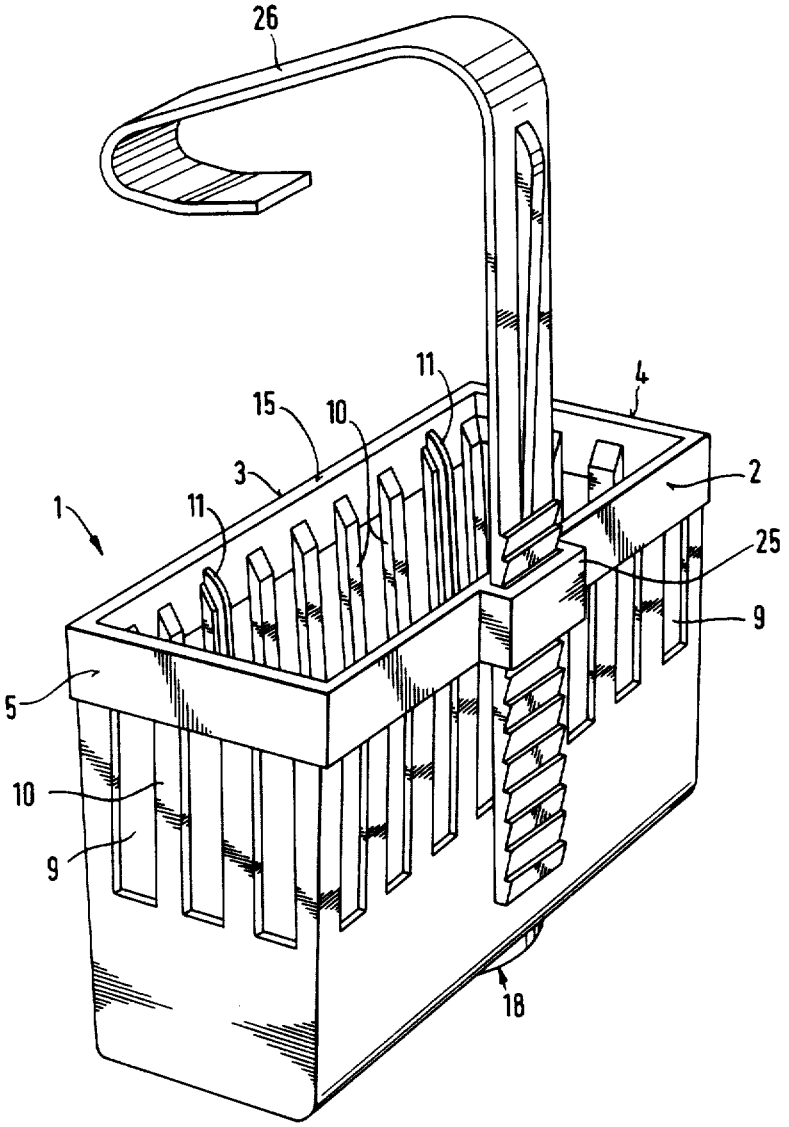
FIG. 1 is a perspective view of a preferred embodiment of the toilet flush water colorizer according to the invention.
Figure 3:
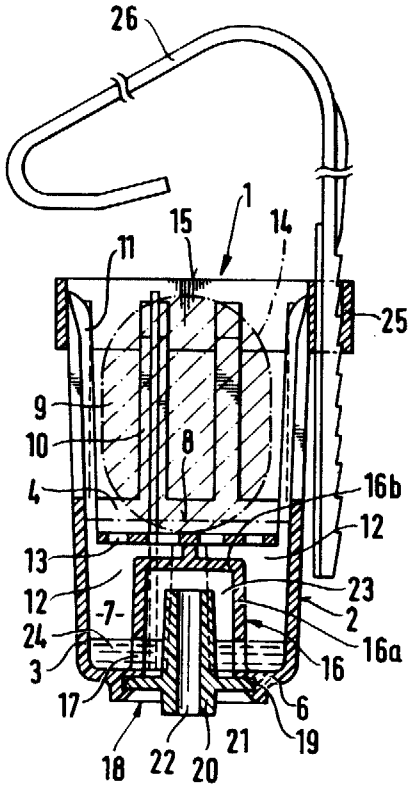
FIG. 3 is a cross-sectional view of the same embodiment, in a plane indicated by III—III in FIG. 2.
Figure 2:
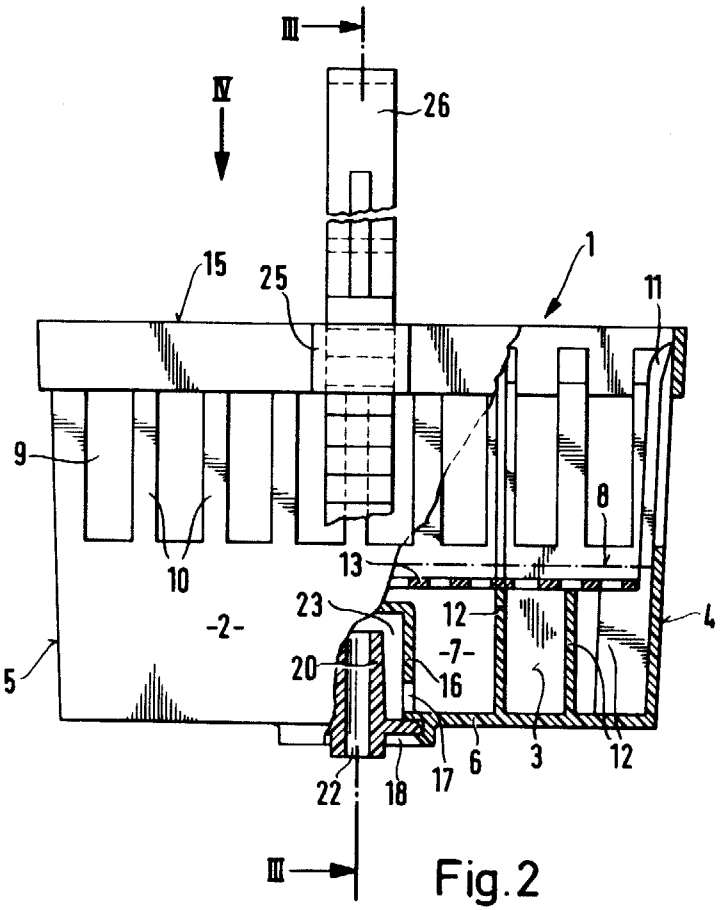
FIG. 2 is a frontal view, partially in section, of the same embodiment.
Figure 4:
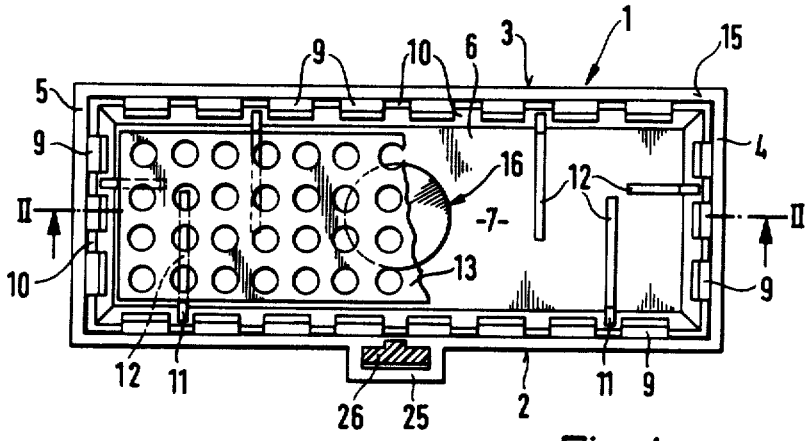
FIG. 4 is a view from above of the same embodiment as shown in FIGS. 1 to 3, of a toilet flush water colorizer being open at the top.

The preferred embodiment of the toilet flush water colorizer according to the invention shown in FIGS. 1 to 4 comprises a container 1 having approximately the shape of a deep trough. The frontal wall 2, the rear wall 3 and the lateral end walls 4 and 5 are closed in their lower region upward to about half the height of the trough, and surround, together with a bottom 6, a diluting space or chamber 7, which latter can be filled with flush water up to a level 8, when the colorizer is hung in a toilet bowl and the flushing mechanism of the toilet is actuated. In the four walls 2, 3, 4 and 5, above the level 8, windows 9 are provided which are separated from one another by port 10. Some of these ports 10 bear on their insides distancing projections 11, and, as supporting means, carrier ribs 12 project horizontally into the interior space of the container 1 at level 8. Preferably, a grid or perforated plate 13 is placed on the carrier ribs 12. A coloring block or stick 14 which is indicated by a phantom line in FIG. 3, rests on the aforesaid supporting means. When a perforated plate 13 is used, the holes therein are preferably so narrow that larger pieces of the block which become loosened by the gradual erosion of the latter, can not fall through these holes into the diluting space 7. At its upper end 15, the container 1 is preferably open.

In the embodiments of FIGS. 1 to 4, a siphoning device is provided in the bottom 6 of the container 1 and comprises a cover part 16, preferably having the shape of an inverted cup, which sits on the inside face of the bottom 6 and has ports 17 provided in its side wall 16a near the bottom 6. In the bottom 6, centrally to the cover part 16, there is provided an opening 18, having a circumferential rim in which an annular groove 19 is provided. A straight discharge tube 20 bearing a closing flange 21 transverse to the tube axis, is pressed with the latter sealingly into the groove 19. Preferably, flange 21 is integral with tube 20. Outlet tube 20 is thus mounted coaxially with cover part 16 and has an axial outlet duct 22. Outlet tube 20 and the interior space 23 of cover part 16, in which the outlet tube 20 projects with its upper end to near the closed roof wall 16b thereof, constitute together a siphoning device by means of which colored flush water, filling the diluting space 7 maximally up to level 8, is suctioned off, at each flushing of the toilet, until the level of the liquid in space 7 has dropped again to the upper end of ports 17. In the liquid sumps 24 which remains above the bottom 6, any "after-dripping" drops of flush water of increasing colorant concentration are collected and diluted. However, due to the siphoning effect of the siphoning device, the phenomenon of "after-dripping" is strongly reduced or even completely avoided.

In the preferred embodiment, the container 1 can be manufactured in one piece from synthetic plastics material by injection molding techniques, whereupon the tube 20 is pressed with its flange 21 into the groove 19 of bottom opening 18, in order to assemble the colorizer.

The container is provided in a conventional manner with a clasp or eyepiece 25 in which a known elastic suspending clip 26 is inserted, by means of which the container 1 can be attached to the inner upper sidewall of a toilet bowl below the inwardly projecting rim bead of the latter, which bead may also project outwardly.

When the flushing mechanism of the toilet is actuated, flush water will flow along the under side of this upper rim bead on the inside at least of the rear wall of the toilet bowl, or, in other types of such bowls also from outlets at the under side of the rim bead about the entire circumference of the toilet bowl, with more or less pressure. This causes a certain turbulence of the flush water stream whereby always a sufficient amount of flush water penetrates into the container 1, dissolving or eroding colorant as well as, if present, other ingredients such as cleansing agents or disinfectants, from the coloring block or stick, whereupon the flush water laden with such ingredients, passes through the openings of the grid or perforated plate 13, or when the latter is missing, between the carrier bars 12 into the diluting space 7 there below.

Under the hydrostatic pressure of the hydrostatic flush water, which collects in diluting space 7 at each flushing, colored flush water will then flow through the siphoning device constituted by cover part 16 and outlet tube 20 from container 1 into the toilet bowl. No "after-dripping" of flush water drops of increased colorant concentration, and hence no staining of the sidewall of the toilet bowl underneath the container 1 will occur.

Figure 5:
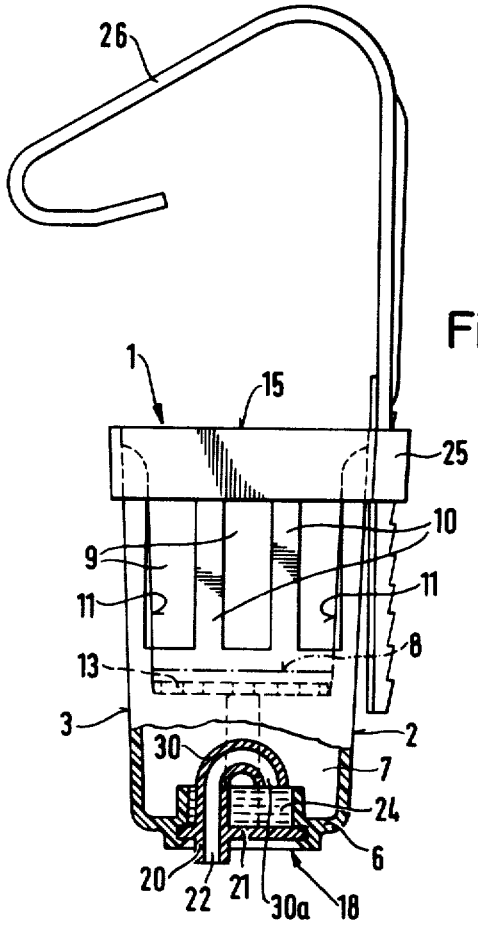
FIG. 5 is a cross-sectional view similar to that shown in FIG. 3, but having a somewhat different embodiment of the siphoning means.

In the embodiment shown in FIG. 5, the siphoning device consists of a simple suctioning tube 30 having a curved, downwardly opening bent portion 30a, the opening of which is inside the diluting space 7 near and above the bottom 6 of the latter. However, the making or assembly of this embodiment is more complicated, as the suction tube 30 is more difficult to make from synthetic plastics material, while its assembly is similar to that of the embodiment of FIGS. 1 to 4, if it is provided with an annular flange by which it can engage the annular groove 19 of central bottom opening 18.

The embodiments shown in FIGS. 6 and 7 comprise a drum-shaped container 31 which is especially suitable for being hung in such toilet bowls in which the flush water does not emerge only at the inside of the rear wall of the toilet bowl but also underneath the circumference of the upper, inwardly projecting bowl bead. Below the level 8, the diluting space 7 and the siphoning device therein are devised analogous to that of the first embodiment, and in the region of the level 8, carrier bars 12 projecting into the interior of container 1 and/or a grid or perforated plate are provided as in the first embodiment.

In the upper part of container 31, the rear wall 33 thereof which is destined to come to lie against the side wall of the toilet bowl, is preferably closed, while the front wall 32 has a number of slots or windows 39 separated from one another by ports 40. Spacing elements 41 can be provided to project from the inside of the front wall 32 and of the rear wall 33.

In its upper wall the container 31 has an elongated axially extending slot or opening 45 and bears, at the edge of the latter adjacent the rear wall 33, an upwardly protruding baffle plate 34. Also in this embodiment, a coloring stick 44 rests on the supporting bars 12 or a grid or perforated plate placed on the latter, and is held in place by the spacing elements 41 which prevent it from resting against the wall of the container with ensuring disuniform erosion.

A fastening clip 46 is also provided, by means of which the container 31 can be hung into a toilet bowl with the upper edge of baffle plate 43 abutting against the underside of the upper inwardly projecting toilet bowl bead in such a manner that flush water outlet orifices in that underside are located inwardly of baffle plate 43 toward the interior of the toilet bowl. Flush water which emerges from these orifices or otherwise streams along that bead underside is deflected by the baffle plate 43 through the axial slot 45 onto the coloring block or stick 44.

In all other aspects, the effect of the diluting chamber 7 and of the siphoning device of that embodiment is the same as in the embodiments of FIGS. 1 to 5.

We claim:

1. A toilet flush water colorizer comprising a container adapted for receiving therein a flush water-coloring block and having at least one entry opening *in the upper part of said container* for admitting *said* flush water thereinto and outlet means for the discharge of colored flush water from said container, said colorizer further comprising means for suspending said container at the inside of a toilet bowl, a diluting chamber in the lower part of the interior of said container and adapted for collecting drops of color concentrate dripping off a block after each flushing; supporting means in said container across the upper end of said diluting chamber and adapted for supporting a flush water-coloring block in the upper part of said container above said diluting chamber, said supporting means having at least one opening for permitting flush water to pass from the upper part of said container into said diluting chamber, said container having a bottom and side walls, said side walls being closed up to the upper end of said diluting chamber, and wherein said outlet means are located in the bottom of said container in communication with said diluting chamber and comprise siphoning means having a siphon passage the apex of which passage is below said upper end of said diluting chamber and below the level of said supporting means, said siphoning means being adapted for siphoning off flush water from said diluting chamber down to a minimum sump level.

2. The toilet flush water colorizer of claim 1, wherein said supporting means have a plurality of openings which are narrow enough to prevent larger pieces of a coloring block being eroded by flush water from dropping into said diluting chamber.

3. The toilet flush water colorizer of claim 1, wherein said supporting means comprise projections from the inner side wall of said container into the interior of the latter.

4. The toilet flush water colorizer of claim 1, wherein said supporting means comprise a grip or perforated plate adapted for supporting a coloring block.

5. The toilet flush water colorizer of claim 1, wherein said siphoning means comprise a suction tube in the lower part of said diluting chamber for suctioning off colored flush water under the hydrostatic pressure thereof in said diluting chamber.

6. The toilet flush water colorizer of claim 5, wherein said suction tube is sealingly inserted in the bottom of said diluting chamber and has its upper end curved whereby its upper opening is near the bottom of said diluting chamber.

7. The toilet flush water colorizer of claim 5, wherein said suction tube is sealingly inserted upright in the bottom of said diluting chamber, having its upper opening near the upper end of said diluting chamber and its lower opening in or underneath said bottom, and wherein said siphoning means further comprise a cover member mounted on said bottom and having a closed upper part inside which the upper end of said suction tube opens, said cover member further having ports near or at the bottom of said diluting chamber for the passage of colored flush water from the latter chamber into the interior of said cover member and into said suction tube.

*8. A toilet flush water colorizer for coloring of flush water flowing from the cistern of a toilet to the toilet bowl and descending on the inner sidewall of the toilet bowl, when said toilet is flushed,*

*said colorizer comprising:*

*a container adapted for receiving a flush-water coloring block in an upper part thereof and having, exclusively in said upper container part, at least one entry opening in the top of said container adapted for having said flush water pass therethrough from said cistern into said container upper part, during the time when said toilet is flushed;*

*suspending means for suspending said container at the upper region of the inner wall of the toilet bowl,*

*said container comprising a diluting chamber having a closed sidewall and being disposed below said upper container part,*

*supporting means adapted for supporting said coloring block and being located at the upper end of said diluting chamber above the highest level maintained by the flush water therein after each flushing until the next-following flushing;*

*said supporting means comprising at least one passage, through which only, at every flushing, flush water can flow from said entry opening and after having had contact with said coloring block in said upper container part, downward into said diluting chamber; and*

*siphoning means comprising a siphon passage having its apex located below said supporting means and below the upper end of said diluting chamber, and adapted for withdrawing colored flush water from said diluting chamber and discharging it through the bottom zone thereof into said toilet bowl.*

* * * * *